UNITED STATES PATENT OFFICE 2,691,039

STILBENE-α-KETOL COMPOUNDS AND PROCESS FOR MAKING THE SAME

Otto Linsert, Wuppertal-Barmen, and Hans Lettré, Heidelberg, Germany, assignors to Schenley Laboratories Inc., New York, N. Y.

No Drawing. Application April 11, 1951,
Serial No. 220,522

5 Claims. (Cl. 260—488)

This invention relates generally to the production of therapeutically useful organic chemical compounds and, in a more particular sense, it is concerned with certain novel compounds that have the physiological activity and produce the therapeutic action of suprarenal cortical hormones.

It is well known that certain suprarenal cortical hormones, such as corticosterone, desoxycorticosterone, cortisone and the like can be isolated by appropriate treatment of animal suprarenal cortex but these procedures have the disadvantage that the quantities of raw material available are restricted and the processes of extraction frequently result in destruction of the physiological properties of the hormones with the result that the product obtained in this manner is extremely costly.

An object of the present invention is to provide materials having the therapeutic activity characteristic of the suprarenal cortical hormones, which may be obtained by synthetic routes that avoid the processing of natural products heretofore thought necessary when producing this type of material.

A further object of the invention is to provide a process for manufacturing substances having the therapeutic properties of suprarenal cortical substances which utilize, as starting materials, readily available organic chemical compounds.

Other objects of the invention will be apparent hereinafter.

In accordance with the present invention, synthetic compounds are obtained which, in terms of therapeutic activity, are equal to compounds such as corticosterone, desoxycorticosterone, cortisone, and the like, these new compounds being stilbene derivatives in which a ketol group, which may be acylated, is attached to one of the carbon atoms of the ethylene bridge. Stilbene-α-ketols are particularly preferred which are substituted, in one or both of the benzene nuclei, by hydroxy-, alkoxy-, alkoxymethoxy- or acyloxy groups. The starting material for producing compounds of this type are the stilbene-α-carboxylic acids of the formula:

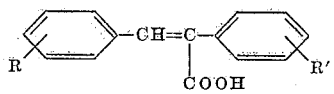

wherein R and R' are of the group consisting of hydrogen, hydroxy, alkoxy, alkoxymethoxy and acyloxy. These stilbene-α-carboxylic acids may be obtained by known processes such as the condensation of phenyl acetic acid or a suitably substituted phenyl acetic acid with benzaldehyde or a suitably substituted benzaldehyde in an acetic anhydride reaction medium. The condensation, preferably, is effected with suitably selected raw materials substituted in the para position by an alkoxy- or an alkoxymethoxy- group, and the production of the hydroxy stilbene carboxylic acids is preferably carried out utilizing the alkoxymethyl ethers because the dealkylation of other types of alkoxy compounds presents certain difficulties owing to the liability of the carboxylic acid group.

The compounds of the present invention may be represented by the formula:

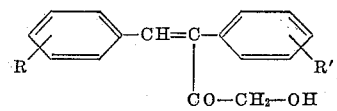

wherein R and R' have the meaning above assigned. These compounds may be obtained from the corresponding stilbene-α-carboxylic acids by converting the latter into their acyl halides, treating these acyl halides with an excess of diazomethane in ethereal solution at a low temperature to produce the corresponding diazoketones, and converting the diazoketones, by reaction with acids, into the corresponding stilbene-α-ketols. The crystallized diazoketones may be recovered in good yield and, depending on their stability, may be converted into the ketols by reaction with aqueous alcoholic mineral acids, for instance, sulfuric acid in a mixture of water and methanol, or into the acyloxy derivatives of these ketols by heating with organic acids. The ketols and their acyloxy derivatives are easily crystallized light-yellow substances.

Among the stilbene-α-carboxylic acids which may, for instance, be used as starting materials in the process of this invention are: 4'-methoxy-stilbene-α-carboxylic acid, 4:4'-dimethoxy-stilbene-α-carboxylic acid, 3':4'-dimethoxy-stilbene-α-carboxylic acid, 3-methoxy-4:4'-dimethoxymethylenoxy-stilbene-α-carboxylic acid, 4'-methoxymethylenoxy-stilbene-α-carboxylic acid, 4:4'-dimethoxymethylenoxy - stilbene - α - carboxylic acid, 4'-acetoxy-stilbene-α-carboxylic acid, 4'-propionyloxy-stilbene-α-carboxylic acid and 4:4'-diacetoxy-stilbene-α-carboxylic acid.

The stilbene-α-carboxylic acids mentioned above may be converted into the corresponding acid chlorides by treatment with thionyl chloride and subsequent reaction with diazomethane, in ethereal solution, at temperatures of at most minus 10° C. On standing in the cold, the diazoketone crystallizes out gradually; it is decomposed with mineral acid at room temperature and the ketol then crystallizes from the solution.

If organic acids are used instead of mineral acids, the acyloxy derivatives are obtained instead of the free ketol, and these compounds may also be obtained in crystalline form.

According to another method of operation, the stilbene-α-ketols or their O-acyl compounds can be obtained by first producing the benzyl-diazoketones from phenyl acetic acids, through the acid halides, then producing the benzyl-ketols or their acyloxy derivatives by hydrolysis of the benzyl diazoketones, and conversion of the latter compounds into the stilbene-α-ketols or their acyloxy derivatives by condensation with benzaldehydes.

The invention is further illustrated by the following examples without being restricted thereto.

Example 1

Approximately 13.6 grams of anisaldehyde, about 16.8 grams of the sodium salt of phenyl acetic acid and 80 cc. of acetic anhydride are boiled for 8 hours. The acetic anhydride is decomposed by adding water gradually, and the 4'-methoxy-stilbene-α-carboxylic acid crystallizes. The mixture is dissolved and precipitated from a 15-fold quantity of ethyl alcohol. Needles melting at 188° C. are obtained in a yield of about 50 per cent of the theoretical.

About 20 grams of 4'-methoxy-stilbene-α-carboxylic acid, 75 cc. of benzene and approximately 30 cc. of thionyl chloride are heated to boiling on the water bath for one hour. The mixture of benzene and excess thionyl chloride is distilled off in vacuo. The residue is taken up in benzene and again evaporated to dryness. The crude acid chloride is taken up in 200 cc. of ether and poured into 300 cc. of an ethereal diazomethane solution cooled to −15° C. The mixture is allowed to stand in ice for one night and the ethereal solution is concentrated to about 400 cc. at a low temperature. On standing in a mixture of ice and common salt the diazo ketone crystallizes out slowly. It may be purified by recrystallization from methanol. Coarse, yellow prisms are obtained which melt at 93° C. The yield amounts to 10 grams of diazo ketone.

For the conversion into the corresponding ketol, 10 grams of the diazo ketone are covered with a mixture of 80 cc. of methanol, 10 cc. of water and 10 cc. of 2-n-sulfuric acid. Evolution of nitrogen begins immediately and after it has ceased the mixture is allowed to stand at room temperature for about 8 hours. It is then heated on the water bath until the crystals have dissolved and on cooling, the 4'-methoxy-stilbene-α-ketol precipitates as coarse, yellow needles melting at 108° C.

For producing the corresponding ketol acetate, the diazo ketone, prepared as above described, is heated with a three-fold quantity of glacial acetic acid until evolution of nitrogen ceases. The desired ketol acetate precipitates from the deep brown solution as yellow leaflets and is purified by recrystallization from methanol. It melts at 128° C.

Example 2

By heating equimolar quantities of anisaldehyde and the sodium salt of 4'-methoxy-phenyl acetic acid as indicated in Example 1, 4:4'-dimethoxy-stilbene-α-carboxylic acid is obtained in the form of needles which melt at 208° C. Yield: 40% of the theoretical.

From 4:4'-dimethoxy-stilbene-α-carboxylic acid the 4:4'-dimethoxy-stilbene-α-ketol is obtained by the same procedure described in Example 1. The very sensitive crude diazo ketone separates, after concentration at 0° C. and standing in a mixture of ice and common salt, as coarse, yellow prisms melting at 82° C. The yield from 20 grams of carboxylic acid amounts to about 8 grams of the diazo ketone.

4:4'-dimethoxy-stilbene-α-ketol acetate is obtained in the form of light-yellow, coarse needles melting at 108° C. on heating the diazoketone in acetic acid solution until evolution of nitrogen ceases.

Example 3

3':4'-dimethoxy-stilbene-α-carboxylic acid melting at 223° C. is obtained from veratraldehyde and the sodium salt of phenyl acetic acid by the procedures described in Example 1. The yield amounts to about 50% of the theoretical.

3':4'-dimethoxy-stilbene-α-ketol is obtained from 3':4'-dimethoxy-stilbene-α-carboxylic acid as indicated in Example 1. Concentration of the ethereal solution in this case is not necessary because the diazoketone is difficultly soluble. From 20 grams of the carboxylic acid about 12 grams of diazo ketone are obtained as thin, light-yellow needles which melt at 80° C.

When treating the diazoketone, obtained as described in Example 1, with aqueous methanolic sulfuric acid, 3':4'-dimethoxy-stilbene-α-ketol is obtained which, when crystallized from methanol, precipitates as coarse, yellow prisms melting at 91° C.

Example 4

About 16.6 grams of the 4-methoxymethylenoxy-benzaldehyde and 16.8 grams of the sodium salt of phenyl acetic acid are heated to boiling in 80 cc. of acetic anhydride for 8 hours. Recovery is effected as described in Example 1. 4'-methoxymethylenoxy-stilbene-α-carboxylic acid crystallizes as needles, melting at 171° C. The yield amounts to 50% of the theoretical.

Approximately 10 grams of the product prepared as above described, 3.5 grams of sulfonamide ($H_2NSO_2NH_2$) and 80 cc. of glacial acetic acid are rendered acid to Congo indicator with 2 N-sulfuric acid and heated on the water bath until the solute is all dissolved. On treating this solution with water, the free hydroxy compound separates as thin needles which melt at 215° C. Acetylation of this product is effected by heating it with acetic anhydride for about one hour. The 4-acetoxy-stilbene-α-carboxylic acid is obtained as thin needles melting at 172° C.

By reaction of this product with thionyl chloride, then subsequently with diazo methane according to Example 1, 4'-acetoxy-stilbene-α-diazo-ketone is obtained, which crystallizes as thin needles melting at 104° C. By heating this product with glacial acetic acid, 4'-acetoxy-stilbene-α-ketol acetate is obtained as crystalline light-yellow needles, melting at 122° C. By treatment of the product with aqueous methanolic sulfuric acid, the 4'-hydroxy-stilbene-α-ketol may be obtained therefrom, as coarse, yellow prisms which melt at 128° C.

Having thus described the subject matter of this invention what it is desired to secure by Letters Patent is:

1. A substance of the class consisting of the compounds represented by the formula:

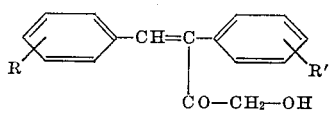

wherein R and R' are of the group consisting of hydrogen, hydroxy, alkoxy, alkoxymethoxy and acyloxy.

2. The compound 4'-methoxy-stilbene-α-ketol represented by the formula:

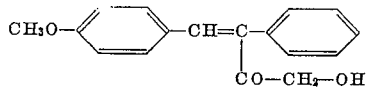

3. The process that comprises reacting a stilbene-α-carboxylic acid represented by the formula:

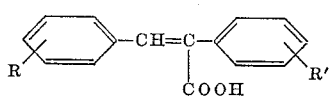

wherein R and R' are of the group consisting of hydrogen, hydroxy, alkoxy, alkoxymethoxy and acyloxy; with thionyl chloride to obtain the corresponding stilbene carboxylic acid chloride; reacting the carboxylic acid chloride with diazomethane in ethereal solution to produce the corresponding diazoketone; treating this product with an acid reagent selected from the group consisting of acetic and aqueous alcoholic mineral acids, and recovering from the reaction mixture the corresponding stilbene-α-ketol of the formula:

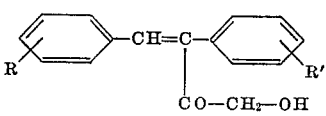

wherein R and R' are as defined above.

4. The process as defined in claim 3 wherein the acid reagent utilized is aqueous methanolic sulfuric acid.

5. Process for the production of 4'-methoxy-stilbene-α-ketol represented by the formula:

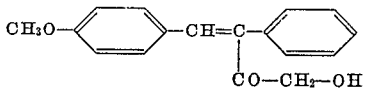

which comprises reacting 4'-methoxy-stilbene-α-carboxylic acid with thionyl chloride to obtain the corresponding stilbene carboxylic acid chloride; reacting the carboxylic acid chloride with diazomethane in ethereal solution to produce the corresponding diazoketone; treating this product with an acid reagent selected from the group consisting of acetic and aqueous alcoholic mineral acids; and recovering from the reaction mixture 4'-methoxy-stilbene-α-ketol.

References Cited in the file of this patent

Dickinson, J. Chem. Soc., 1926 volume, pp. 2234–2241.

Heilbron et al., J. Chem. Soc., 1929 volume, pp. 937 and 938.